United States Patent [19]
Furuta

[11] 3,892,640
[45] July 1, 1975

[54] METHOD OF PURIFICATION OF WASTE WATER PRODUCED FROM THE PACKING OF MEAT AND AQUATIC ANIMALS

[75] Inventor: Motohiro Furuta, Abashiri, Japan
[73] Assignee: Zenkoku Reitogyoniku Kyokai, Hokkaido, Japan
[22] Filed: Mar. 27, 1973
[21] Appl. No.: 345,286

[30] Foreign Application Priority Data
Mar. 31, 1972  Japan.............................. 47-31735

[52] U.S. Cl. .................. 204/149; 204/152; 210/42
[51] Int. Cl. ......................... B01k 3/00; C02b 1/82
[58] Field of Search ........ 204/149, 130; 210/42, 44, 210/47

[56] References Cited
UNITED STATES PATENTS

| | | | |
|---|---|---|---|
| 937,210 | 10/1909 | Harris | 204/149 |
| 1,194,000 | 8/1916 | Dobyns et al. | 204/149 |
| 1,222,637 | 4/1917 | Landreth | 204/149 |
| 1,543,324 | 6/1925 | DeRaeve | 204/149 X |
| 2,997,430 | 8/1961 | Föyn | 204/149 X |
| 3,035,992 | 5/1962 | Hougen | 204/149 |
| 3,479,281 | 11/1969 | Kikindai et al. | 204/149 X |
| 3,505,188 | 4/1970 | Pan | 204/149 |
| 3,586,627 | 6/1971 | Gooch | 204/149 X |

Primary Examiner—John H. Mack
Assistant Examiner—A. C. Prescott
Attorney, Agent, or Firm—Sherman & Shalloway

[57] ABSTRACT

A method of purifying the contaminated waste water that is produced in the slaughter and processing of livestock and aquatic animals, said method comprising adding to said waste water at least one electrolyte selected from the group consisting of the halides, halogen acid salts and nitrates of the alkali metals, alkaline earth metals and ammonium in an amount such that the concentration of said electrolyte in the waste water is 0.03–1.7% by weight, passing a direct-current electricity through the electrolyte-added waste water to effect its electrolysis, and thereafter separating the precipitated solid matter from the waste water.

4 Claims, 4 Drawing Figures

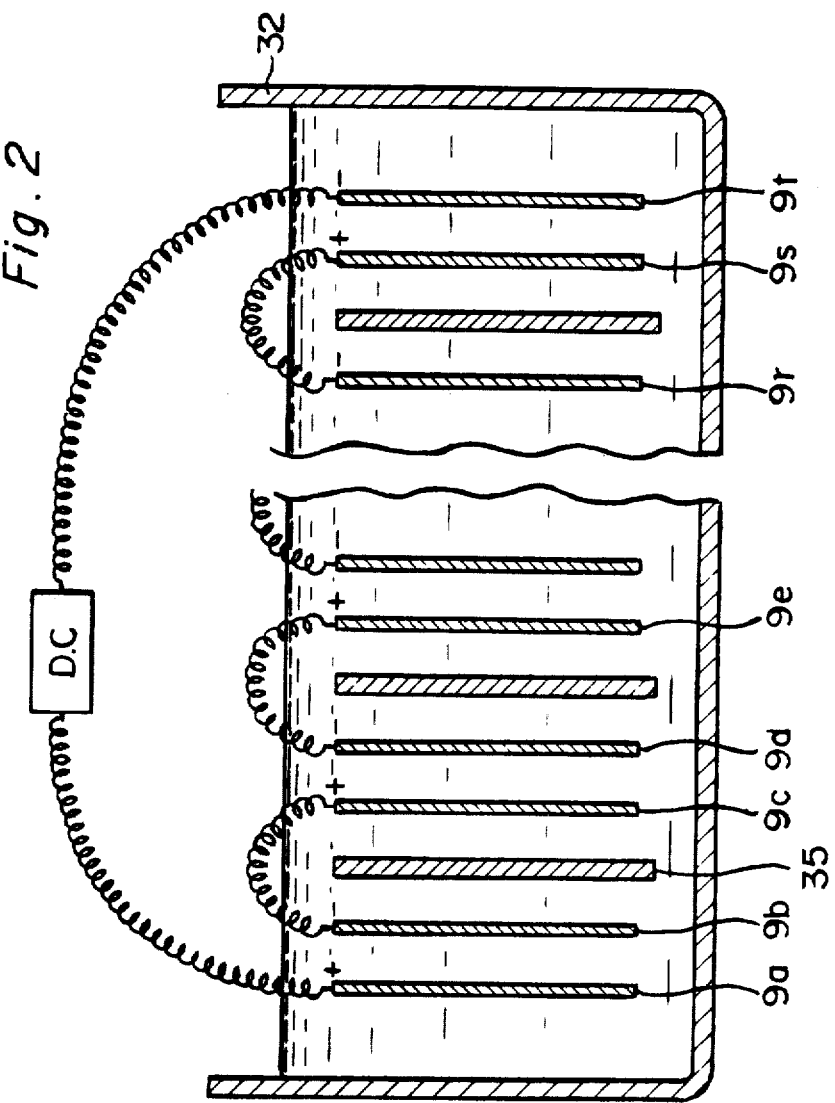

METHOD OF PURIFICATION OF WASTE WATER PRODUCED FROM THE PACKING OF MEAT AND AQUATIC ANIMALS

This invention relates to a method of purification of waste waters that are produced in the slaughter and processing of livestock and aquatic animals.

The waste waters that are produced during the processing of such minced flesh for the preparation of minced fish products, washing of the fish and whale bodies to be used as raw materials, the washing of the slaughtered livestock, etc., contain minute flesh tissues, water-soluble protein, dissolved visceral matter, blood, etc., in a large quantity, and hence the values of biochemical oxygen demand (BOD) and chemical oxygen demand (COD) are exceedingly high. Since these substances are dispersed in a colloidal state, they cannot be separated by such procedures as centrifuging or filtration. Especially, in the case where a filter paper is used, they will pass at the beginning while the filter paper is still new, but within several tens of seconds solid matter adheres to the paper and renders the passage of the material completely impossible. When such waste waters are discharged into the streams in their untreated state, they become the source of pollution of the waters of the rivers and seas. Hence, a method of purification of these waste waters is being demanded.

In the past as a method of removing these contaminative constitutents from the waste waters, there is known the activated sludge method in which the purification is achieved by allowing organic matter to feed on the microorganisms contained in the waste water. Another known method is the pressurized flotation method. In this latter method the protein contained in the waste water is flocculated by adjusting the pH and then caused to float by blowing in pressurized air. However, in the case of the activated sludge method, not only a prolonged period of time is required for the treatment, but also because of the requirement that the temperature must be above 10°C., it was not possible to obtain satisfactory results in cold localities or during the winter season. Further, in the case of waste waters containing a large quantity of protein and of very high BOD load, it was necessary before carrying out the purification by the activated sludge method, to remove in advance the protein to a certain extent by, for example, the pressurized flotation method. On the other hand, in the case of the pressurized flotation method, the purification standards for waste water established by the public authorities cannot be achieved and the hemoglobin does not disappear. Hence, a secondary treatment, say, the activated sludge method must be performed. Thus, the methods described above cannot be regarded as being appropriate purification methods because of the tremendous cost required for their equipment and operations.

Lately, there has been proposed a method which comprises washing the fish and aquatic animal bodies with either seawater or a 3 % saline solution and then passing an electric current through the resulting waste seawater or saline solution to effect its electrolysis and thereby carrying out by means of the chlorine gas evolved the deodorization and the deamination of the waste water. [Summary of Lectures, Autumnal Convention of the Japanese Society of Scientific Fisheries, (1970) page 9.] However, the foregoing conventional purification methods by means of electrolysis required in all cases a prolonged period of time of the order of 30 – 60 minutes.

Since the waste water to be purified is usually of large quantity, the requirement for a prolonged period of time for its purification means that tanks having great capacity and a large-scale equipment for the treatment are required. Hence, this is very uneconomical.

It is therefore an object of the present invention to eliminate the foregoing drawbacks of the conventional methods and provide a method which can purify promptly and efficiently the waste waters that are produced when slaughtering and processing fish and livestock. The foregoing object of the invention is achieved by a method which comprises adding to contaminated waste water produced during the slaughtering or processing of aquatic animals or livestock one or more electrolytes selected from the group consisting of the halides, halogen acid salts and nitrates of the alkali metals, alkaline earth metals and ammonium in an amount such that the concentration of said electrolytes in the waste water is 0.03 – 1.7 % by weight, passing a direct-current electricity through the electrolyte-added waste water to effect its electrolysis, and thereafter separating the precipitated solid matter from the waste water to thereby purify the waste water.

According to the present invention, waste waters can be purified in a short time with a simple operation. Moreover, the purification effects achieved are very great. In addition, whereas the blood contained in waste waters turns yellow in the case where no salts are added, the solid matter containing the hemoglobin is completely removed by the invention method. Hence, there is the advantage that the waste water can be transformed into a colorless liquid.

As previously indicated, the electrolytes used in the present invention include the halides, halogen acid salts and nitrates of the alkali metals, alkaline earth metals and ammonium, and mention can be made of such, for example, as $NaCl$, $KCl$, $NH_4Cl$, $KBr$, $KI$, $KBrO_2$, $NaNO_2$, $KNO_3$, $NH_4NO_3$, $CaCl_2$ and $MgCl_2$. In view of the fact that NaCl is readily available, it is most conveniently used, and advantageously used is seawater in an amount such that the salt concentration of the waste water comes within the prescribed range.

The concentration of the electrolyte in the waste water to be submitted to electrolysis must come within the range of 0.03 – 1.7 %, and preferably 0.3 – 0.5 %.

The electrolysis of the waste water is accomplished by passing a direct-current electricity through the electrolyte-containing waste water charged to an electrolytic tank via electrodes comprising a cathode and anode. As examples of the electrodes for use in this electrolysis, usable for the anode are iron, stainless steel and aluminum and for the cathode, iron, aluminum and carbon.

While the electrolytic voltage, magnitude of current density are not critical, usually used is a electrolytic voltage of 2 – 6 volts and a current of 5 – 2,000 amperes per pair of electrodes. The time required for the electrolysis is less than 20 minutes, preferably 5 – 15 minutes. By raising the value of the electric current at this time, a further reduction of the treatment time is possible. The waste water whose electrolysis has been completed is withdrawn from the electrolytic tank, and the precipitated solid matter is separated. For accomplishing the separation, filtration or centrifuging is convenient.

The electrolysis is usually carried out at room temperature. However, for reducing the electric resistance of the electrolytic bath and enhancing the efficiency of the electrolysis, heating of the waste water to a temperature of usually of 20° – 30°C. is also permissible.

As waste waters to which the present invention can be applied, included are such as water in which minced fish flesh has been hydrated and of BOD of the order of 1,000 – 5,000, wash water of fish and whale bodies, wash water of slaughtered livestocks at packing plants, etc., the invention being especially effective in the case of waste waters containing blood.

In carrying out the purification of waste waters by the invention electrolytic method, one or more treatment tanks are used in accordance with the amount of waste water to be treated. When two or more treatment tanks are used, the operation is preferably carried out in the following manner. First, the No. 1 tank is filled with the waste water to be treated, and as soon it is completely filled, the electrolysis of this is started. In the meantime the No. 2 tank is filled with the waste water, and by the time No. 2 tank becomes filled, the electrolysis of the No. 1 tank is completed. The electrolysis of the No. 2 tank is then started, and while the electrolysis of the No. 2 tank is proceeding, water from No. 1 tank whose electrolysis has been completed is discharged while the No. 3 tank is filled with waste water to be treated. Thus by filling the several tanks in sequence and carrying out their electrolysis by repeating the phases of filling the tanks, electrolysis, and discharging the treated water with these phases staggered, the purification operation is conveniently carried out continuously.

After completion of the electrolysis, the solid matter contained in the treated water discharged from the treatment tank is separated by such means as centrifugation, filtration and settling. Especially good results are obtained when the treated water is sand-filtered.

According to the present invention, it becomes possible to carry out the purification treatment of waste water with good efficiency as a result of its continuous purification. The invention method also excels in its purification ability. For instance, it is able to take waste water having a degree of transparency of zero and, after treatment treating a water, discharge this waste water as a completely transparent water.

The solid matter separated and recovered from the waste water, being fish flesh, meat flesh and blood, etc., can be utilized as fertilizer, etc.

The invention method will now be described with reference to the accompanying drawings.

FIG. 2 is a partial schematic view illustrating an instance of the arrangement of the electrodes in an electrolytic tank used in the invention method.

Figure 1:
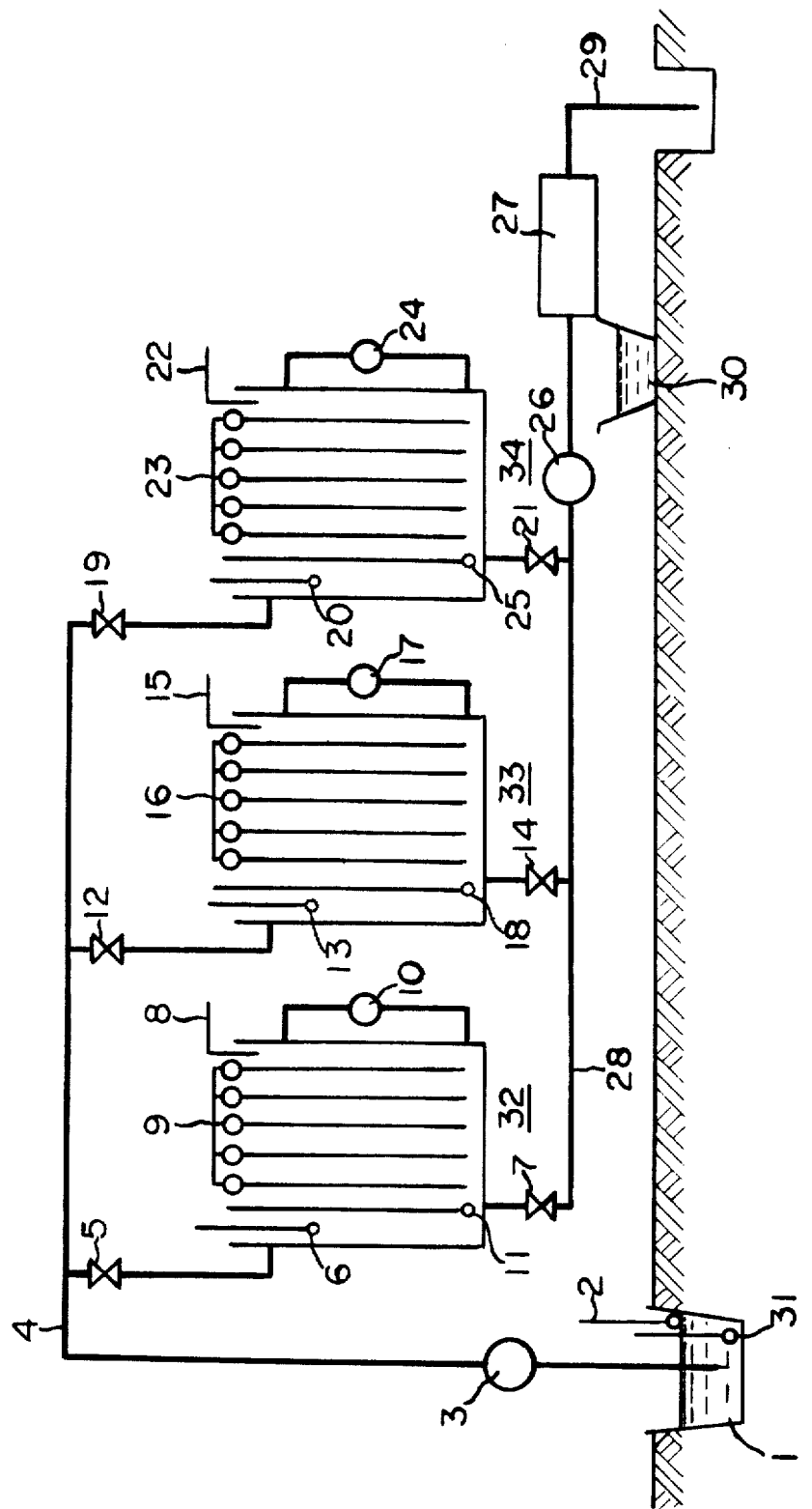
FIG. 1 is a flow chart illustrating the steps of the electrolytic method of the invention and the arrangement of the apparatus.

Referring to FIG. 1, 1 is the reservoir of the waste water; 32, 33 and 34 are the electrolytic tanks; 2 and 31 are the liquid level switches of the waste water reservoir; 3 and 26 are the pumps; 4 is the waste water feed line; 5, 12, and 19 are the magnetic valves in the waste water feed line; 6, 13 and 20 are the liquid level switches of the electrolytic tanks; 9, 16 and 23 are the electrodes; 7, 14 and 21 are the magnetic valves in the line for discharging the purified waste water; 8, 15 and 22 are metering devices for adding the electrolyte; 10, 17 and 24 are circulating pumps; 11, 18 and 25 are the liquid level relays; 27 is the continuous filter; 28 is the discharge line for the purified waste water; 29 is the discharge outlet; and 30 is the scum recovery vessel.

The waste water stored in the reservoir 1 is conveyed to an electrolytic tank via line 4 by the pump 3, which is actuated by the liquid level switch 2. At this time, only the magnetic valve 5 opens by means of an automatic operation panel (not shown) to introduce the waste water to the electrolytic tank 32. When the electrolytic tank 32 becomes full, the magnetic valve is closed by means of the liquid level switch 6, while the magnetic valve 12 opens and the waste water is next introduced to the electrolytic tank 33. Concurrently, at the electrolytic tank 32 an electric current is caused to flow to the electrode 9, common salt in an amount of 0.3 %, based on the amount of the waste water, is introduced by way of the metering device for adding the electrolyte, the circulating pump 10 is actuated to cause the waste water to circulate, and the electrolysis is carried out for 5 minutes at a voltage across the terminal electrodes of 200 volts and a current of 1,000 amperes while preventing the settling or rising of the solid matter. Next, when the flow of the current stops, the magnetic valve 7 opens, and the purified waste water is conveyed by means of the pumps 26 via the line 28 to the continuous filter 27, where the purified waste water and the scum are separated. The purified waste water is then discharged from the discharge outlet 29 and the scum is transferred to the vessel 30. On completion of the discharge of the water from the electrolytic tank 32, the liquid level relay 11 is actuated and the magnetic valve 7 closes.

At the point the electrolytic tank 32 has become full, the magnetic valve 5 closes while the magnetic valve 12 opens, and the introduction of the waste water to the electrolytic tank 33 commences. When the electrolytic tank 33 becomes full, an electric current is caused to flow to the electrode 16, as in the case with the electrolytic tank 32, by means of the liquid level switch 13, and as in the case previously described, the magnetic valve 12 closes and the magnetic valve 19 opens to introduce successively the waste water to the electrolytic tank 34. The electrolysis of the electrolytic tank 33 is carried out as in the case with that of the electrolytic tank 32, while in the meantime the discharge of the water from the electrolytic tank 32 takes place.

When the electrolytic tank 34 becomes full of water, the electrolysis thereof is commenced, and concurrently the introduction of the waste water to the electrolytic tank 32 is started.

Thus, when there is the provision of at least three electrolytic tanks as in the case described above, the electrolytic purification of the waste water can be repeatedly carried out in succession to make possible the continuous treatment of the waste water.

The invention apparatus is equipped with an automatic operation panel consisting of a combination of timers, auxiliary relays, and magnetic switches; and automatic control rectifiers which automatically control and maintain at a constant current by means of thyristors the fluctuations in the current resulting from the changes in the electric resistances due to changes in the turbidity and temperature of the waste water as well as effect the automatic transfer of operations among the several electrolytic tanks 32, 33 and 34. The means of maintaining the electric current constant is by means of thyristors known per se.

While the foregoing description illustrates the instance where at least three electrolytic tanks were used, needless to say, the invention method can also be carried out even when only one or two electrolytic tanks are used.

FIG. 2 illustrates in part the disposition of the electrodes 9 in the electrolytic tank 32 of FIG. 1. As shown in FIG. 2, the inside of the electrolytic tank 32 is divided equally into ten compartments by means of nine partitioning plates 35 consisting of an electrically insulating material, say, a polyvinyl chloride resin. In the several compartments are then disposed a first pair of electrodes consisting of an anode 9a and a cathode 9b; a second pair of electrodes consisting of an anode 9c and a cathode 9d; a third pair of electrodes consisting of an anode 9e and a cathode 9d; .... and a tenth pair of electrodes consisting of an anode 9s and a cathode 9t. The adjacent anodes and cathodes, i.e., 9b and 9c, 9d and 9e, .... 9r and 9s are then connected, and a direct current voltage is then applied across the terminal anode and the terminal cathode. That is to say, the electrodes are connected in series with a direct-current electric source. The partitioning plate 35 should preferably be such that the area of the surface of the partitioning plate in parallel to the electrodes is at least 60 % of the area of a section of the electrolytic tank cut by a plane in parallel to the electrode plate. If this value is less than 60 %, the time required for the electrolysis becomes considerably longer.

For instance, when 1.6 tons of waste water containing minute fish flesh protein and water-soluble protein is placed in a tank (capacity 2 tons) having a width of 1 meter, height of 1 meter and length of 2 meters, the tank is partitioned evenly into ten compartments with partitioning plates of a polyvinyl chloride resin having a thickness of 2 mm, a height of 90 cm and width of 90 cm (area submerged in the electrolyte 810 cm$^2$), electrodes 9a, 9b, ....... 9s, 9t are inserted in the several compartments with an interval of 20 mm between the electrodes, and thereafter a direct-current electricity of 20 volts and 320 amperes is caused to flow between the two end terminals, i.e., a direct-current electricity of 2.0 volts and 320 amperes is caused to flow between the anodes and cathodes of the several compartments, the electrolysis is completed in 15 minutes.

For treating a large amount of waste water in a short period of time, the intervals between the electrodes 9a, 9b, 9c .... are made as short as possible and the electrolytic tank 32 is divided into the greatest number of compartments. Thus will it be possible to carry out the electrolysis at a low voltage and low current.

While the description made hereinbefore dealt with the case where the electrolytic tank was partitioned with partitioning plates and the electrodes were connected in series, it is also permissible to connect the several anodes and cathode in parallel with a direct-current source.

Figure 4:
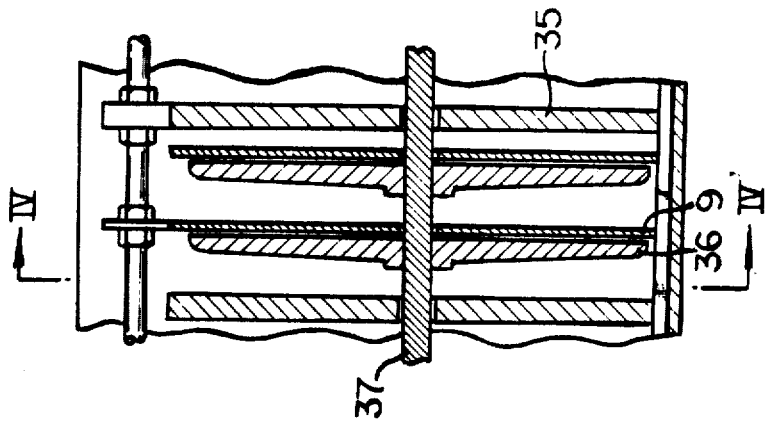
FIG. 4 is a view showing a section taken along line III – III' of FIG. 3.
Figure 3:
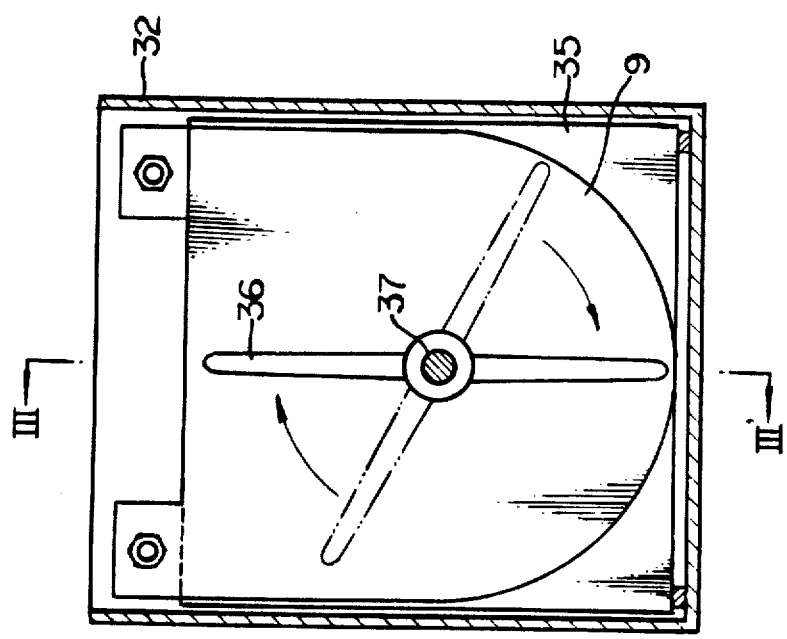
FIG. 3 is a side view of an electrode plate of the invention having a scraping vane.

During the electrolytic process there are times when the surface of the electrodes become adhered with electrolytic coagula such as mucus of fish surface, minute flesh tissues, water-soluble protein and dissolved visceral matter that are contained in the waste water, with the consequence that the efficiency of continuous treatment of waste water is reduced. For preventing such a phenomenon, it is an advantage to provide between the several electrodes that depend in the several treatment tanks in parallel to each other, rotary scraping vanes which are constantly in rotating contact with the electrode surfaces thereby effecting not only the removal of the adhered matter but also the agitation of the waste water that is introduced to the treatment tank. FIGS. 3 and 4 illustrate a straight-line vane 36 which, by being mounted on a shaft 37 that pierces through the center of the several electrode plates 9 and partitioning plates 35, is rotated by a motor located externally of the tank. In concomitance with the rotation of the vane 36, the adhesion of the electrolytic coagula to the surface of the electrode is prevented. In addition, there is the advantage that the electrolytic treatment is promoted by the constant agitation of the waste water inside the treatment tank.

The following examples are given for further illustration of the invention. In the examples the percentages are on a weight basis unless otherwise indicated.

The COD, clarity, degree of redness, total nitrogen and filtrability indicated in the examples were determined by the following test methods.

1. COD

The COD was determined in accordance with the JIS Method K0102 by measuring the amount consumed of potassium permanganate by the liquid tested at 100°C, followed by calculation as follows:

$$O = (b - a) \times f \ \frac{1000}{V} \times 0.2$$

wherein:
O is the amount of oxygen consumed by the potassium permanganate (O)(ppm).
b is the total amount of the N/40 potassium permanganate solution required for the titration (ml).
a is the amount of the N/40 potassium permanganate solution required for the titration of the blank test (ml).
f is the factor of the N/40 potassium permangante solution.
V is the volume of the liquid tested (ml).

2. Clarity and degree of redness

The determinations of the clarity and the degree of redness were made in accordance with the JIS Method Z8722, using a color difference meter in accordance with the X Y Z system.

The sample whose rate of transmittance of light equals that of the solvent is considered as having a clarity of 100 %. On the other hand, the degree of redness is indicated by its content of the solute (%).

3. Total nitrogen content

The total nitrogen content was determined in accordance with the JIS Method K0102, the determination being conducted in the following manner. The organic nitrogen contained in the liquid tested was thermally decomposed, following which the ammonium ions formed were caused to be absorbed by N/20 sulfuric acid and thereafter this ammonium ion-absorbed liquid was titrated with N/20 sodium hydroxide. The total nitrogen content was then determined as follows:

$$N = (50 \times f - a \times f_2) \times \frac{1000 \times 0.7}{V}$$

wherein:

N is organic nitrogen (total nitrogen) (N) (ppm).

$f$ is the factor of N/20 sulfuric acid.

$a$ is the amount of the N/20 sodium hydroxide solution required for the titration (ml).

$f_2$ is the factor of the N/20 sodium hydroxide solution.

$V$ is the amount of the liquid tested (ml).

4. Filtrability

Five hundred ml of the liquid being tested was filtered using a No. 2 filter paper. The sample whose filtration was completed within 5 minutes was considered to possess good filtrability. On the other hand, the sample in which clogging of the filter took place and the time required for the filtration exceeded 5 minutes was considered as being poor in its filtrability.

5. Degree of transparency

In accordance with the test procedure stipulated in JIS K0102, the test liquid is put into a glass cylinder with a height of 320 mm and a diameter of 33 to 35 mm. The maximum height of the liquid level from which a sign of the bottom can be distinguished is measured. The height is expressed in centimeters, and made the degree of transparency.

EXAMPLE 1

To each of the several 500-ml portions of waste water resulting from the processing of frozen minced flesh of pollack (COD 1,266 ppm, clarity 48.8 %, redness 2.4 %) was added common salt in an amount such that the concentrations would be respectively 0.05 %, 0.3 %, 1.5 %, 2 % and 3 % (the latter two being comparisons), while the portion with no addition of the common salt was used as control. A pair of electrodes consisting of iron as the anode and stainless steel as the cathode was used, and a current of 3 amperes was caused to flow between the electrodes at a voltage of 12 volts for varying periods of time with the results shown in Table 1.

EXAMPLE 2

To 500 ml of waste water resulting from the processing of frozen minced flesh of pollack (COD 1,334 ppm, clarity 46.7 %, redness 2.5 %) was added potassium nitrate in an amount of 0.5 %, after which the electrolysis was carred out for 15 minutes at a voltage of 12 volts, using a pair of electrodes consisting of iron as the anode and carbon as the cathode. As a consequence, treated water of exceedingly good quality was obtained, the COD being 206 ppm (rate of removal 84.6 %), BOD 180 ppm (rate of removal 95.9 %), total nitrogen 45 ppm (rate of removal 91.6 %), clarity 99.3 % and redness 0 %.

As control, when the waste water was treated in like manner but without adding the potassium nitrate, the treated water obtained was unsatisfactory, the COD being 521 ppm (rate of removal 61 %), BOD 1680 ppm (rate of removal 61.9 %), total nitrogen 320 ppm (rate of removal 40.3 %), clarity 67.6 % and redness 2.5 %.

EXAMPLE 3

The waste water resulting from the processing of frozen minced flesh of pollack, such as that used in Example 2, was treated as in Example 2 using potassium bromide. As a consequence, treated water of exceedingly good quality was obtained, the BOD being 150 ppm (rate of removal 96.6 %), total nitrogen 118 ppm (rate of removal 78.1 %), clarity 99.5 % and redness 0 %.

Similarly, when the treatment was carried out using potassium iodide, a very good quality treated water was likewise obtained, the BOD being 136 ppm (rate of removal 96.9 %), total nitrogen 161 ppm (rate of removal 70.0 %), clarity 99.5 % and redness 0 %.

Again, when the treatment was carried out using calcium chloride, magnesium chloride, ammonium chloride and ammonium nitrate, similar results were obtained.

Table 1

| Amount of common salt added (%) | Items tested | Time of electrolysis (min.) | | | | | | | Remarks |
|---|---|---|---|---|---|---|---|---|---|
| | | 0 | 5 | 10 | 15 | 20 | 30 | 50 | |
| 0 | COD ppm | 1266 | *662 | *658 | *621 | *380 | 285 | 246 | *Poor filtrability up to 20 minutes |
| | Removal rate % | — | 47.8 | 48.1 | 51.8 | 70.0 | 77.5 | 80.6 | |
| | Clarity % | 48.8 | 66.1 | 67.9 | 68.4 | 93.5 | 99.8 | 99.7 | |
| | Redness % | 2.4 | 2.8 | 2.8 | 2.5 | 0 | 0 | 0 | |
| 0.05 | COD ppm | | *371 | 229 | 229 | 239 | 219 | 213 | *Poor filtrability up to 5 minutes |
| | Removal rate % | | 70.7 | 81.9 | 81.9 | 81.1 | 82.7 | 83.2 | |
| | Clarity % | | 75.6 | 99.8 | 99.9 | 99.8 | 100 | 100 | |
| | Redness % | | 2.0 | 0 | 0 | 0 | 0 | 0 | |
| 0.3 | COD ppm | | 254 | 236 | 212 | 211 | 212 | 208 | |
| | Removal rate % | | 80.0 | 81.4 | 83.3 | 83.3 | 83.2 | 83.6 | |
| | Clarity % | | 99.6 | 99.8 | 100 | 100 | 100 | 100 | |
| | Redness % | | 0 | 0 | 0 | 0 | 0 | 0 | |
| 1.5 | COD ppm | | 260 | 237 | 228 | 210 | 210 | 211 | |
| | Removal rate % | | 79.5 | 81.3 | 82.0 | 83.4 | 83.4 | 83.3 | |
| | Clarity % | | 99.4 | 99.7 | 99.9 | 99.9 | 100 | 100 | |
| | Redness % | | 0 | 0 | 0 | 0 | 0 | 0 | |
| 2.0 | COD ppm | | *377 | 331 | 298 | 217 | 212 | 214 | *Poor filtrability up to 5 minutes |
| | Removal rate % | | 70.7 | 73.9 | 76.5 | 82.8 | 83.3 | 83.1 | |
| | Clarity % | | 92.8 | 93.6 | 99.1 | 99.7 | 99.7 | 99.9 | |
| | Redness % | | 0.3 | 0 | 0 | 0 | 0 | 0 | |
| 3.0 | COD ppm | | *371 | 347 | 295 | 221 | 207 | 211 | *Poor filtrability up to 5 minutes |
| | Removal rate % | | 70.7 | 72.6 | 76.7 | 82.6 | 83.7 | 83.3 | |
| | Clarity % | | 92.3 | 94.4 | 98.7 | 99.7 | 99.9 | 99.8 | |
| | Redness % | | 0.5 | 0 | 0 | 0 | 0 | 0 | |

EXAMPLE 4

To 500 ml of waste water resulting from the processing of frozen minced flesh of pollack (COD 874 ppm, BOD 3500 ppm, total nitrogen 498 ppm, clarity 58.6 % and redness 1.9 %) was added 0.5 % of common salt, and the electrolysis was carried out for 10 minutes with a 12-volt current, using a pair of electrodes consisting of an anode of stainless steel and a cathode of aluminum. As a result, treated water of good quality was obtained, the COD being 241 ppm (rate of removal 72.4 %, BOD 620 ppm (rate of removal 82.3 %), total nitrogen 226 ppm (rate of removal 54.6 %), clarity 99.7 % and redness 0 %.

As control, the waste water was similarly electrolyzed but without the addition of the common salt, whereupon the resulting treated water had a COD of 450 ppm (rate of removal 48.5 %), BOD of 1,436 ppm (rate of removal 59 %), total nitrogen of 402 ppm (rate of removal 18.3 %), clarity of 67 % and redness of 2.2 %. The rate of purification of this treated water was thus low and moreover its filtrability was very poor.

EXAMPLE 5

Five hundred ml of a meat packing plant waste water (COD 860 ppm, total nitrogen 264 ppm, clarity 48.9 % and redness 13.4 %) was added with 0.5 % of potassium chloride and then electrolyzed for 15 minutes with a 12-volt current, using a pair of electrodes consisting of an anode of stainless steel and a cathode of aluminum. The resulting treated water was of very good quality, its COD being 54 ppm (rate of removal 93.7 %), total nitrogen 12.7 % (rate of removal 95.2 %), clarity 99.8 % and redness 0 %.

By way of comparison, when the electrolysis was conducted in similar manner but without the addition the potassium chloride, the quality of the resulting treated water was not satisfactory, its COD being 688 ppm (rate of removal 20.1 %), total nitrogen 220 ppm (rate of removal 16.7 %), clarity 53.4 % and redness 17.6 %.

EXAMPLE 6

The treatment of the meat packing plant waste water used in Example 5 was carried out as described therein but using calcium chloride. The resulting treated water was of very good quality, its COD being 57 ppm (rate of removal 93.4 %), total nitrogen 27.3 ppm (rate of removal 89.7 %), clarity 96.3 % and redness 0 %.

Further, when the treatment was carried out using magnesium chloride instead of calcium chloride, similar results were obtained.

EXAMPLE 7

The treatment of the meat packing plant waste water used in Example 5 was carried out as described therein but using ammonium nitrate. The resulting treated water was of exceedingly good quality, its COD being 63 ppm (rate of removal 92.7 %), clarity 99.4 % and redness 0 %.

Again, similar results were obtained when ammonium chloride was used in the treatment instead of the ammonium nitrate.

EXAMPLE 8

0.5 % of common salt was added with stirring to 500 ml of the waste water used in Example 5, and the electrolysis was carried out as described therein, whereupon the treated water obtained was of very good quality, its COD being 69 ppm (rate of removal 92 %), total nitrogen 18.2 ppm (rate of removal 93.1 %), clarity 99.8 % and redness 0 %.

EXAMPLE 9

One ton per minute of waste water discharged from a marine products processing plant (BOD 5000 ppm, COD 1800 ppm, nitrogen content 600 ppm, clarity 45 % and redness 5 %) was electrolyzed for 5 minutes with a voltage across the terminal electrodes of 200 volts and a current of 1000 amperes, using the appartus shown in FIG. 1.

The purified water discharged from the discharge outlet 29 was clear (BOD 215 ppm, COD 88 ppm, nitrogen content 30 ppm, clarity 99.3 % and redness 0 %), and the amount of scum recovered in the vessel 30 was about 0.5 %.

EXAMPLE 10

The same apparatus as that used in Example 9 was used, and the electrolysis was carried out as described therein for 5 minutes with a voltage across the terminal electrodes of 200 volts and a current of 1000 amperes by adding as the electrolyte common salt at the concentrations indicated in Table 2. The results obtained are shown in Table 2. The expression "sand-filtration," as used in the table, denotes those instances where further purification by means of sand-filtration was carried out subsequent to the electrolytic treatment.

Table 2

|  | Amount of NaCl added % | COD ppm | Removal rate % | BOD ppm | Removal rate % | Nitrogen content ppm | Removal rate % | Clarity % | Redness % |
|---|---|---|---|---|---|---|---|---|---|
| Original water | — | 1440 | — | 3250 | — | 603 | — |  |  |
| Treated water | 0.1 | 461 | 68.0 | 824 | 74.6 | 250 | 58.5 |  |  |
| " | 0.3 | 483 | 66.5 | 939 | 71.1 | 232 | 61.5 |  |  |
| " | 0.5 | 471 | 67.0 | 932 | 71.3 | 261 | 56.7 |  |  |
| Original water | — | 1750 | — |  |  | 678 | — | 15.3 | 3.3 |
| Treated water | 0.3 | 260 | 85.1 |  |  | 230 | 66.1 | 99.3 | 0 |
| After sand-filtration | 0.3 | 88 | 95.0 |  |  | 50 | 92.6 | — | — |
| Original water | — | 1022 | — |  |  |  |  |  |  |
| Treated water | 0.2 | 245 | 76.0 |  |  |  |  |  |  |
| After sand-filtration | 0.2 | 218 | 78.0 |  |  |  |  |  |  |
| Original water | — | 1792 | — | 5220 | — |  |  |  |  |
| Treated water | 0.2 | 362 | 79.8 | 1215 | 76.7 |  |  |  |  |

EXAMPLE 11

Five tons of waste water resulting from the processing of minced fish flesh was treated with the pressurized flotation method. This same waste water was electrolyzed using the same apparatus as that used in Example 9, the electrolysis being conducted under the conditions indicated in Table 3, using iron for the anode and stainless steel for the cathode and adding common salt as the electrolyte at the concentrations indicated in Table 3. The results so obtained are shown in said Table 3.

hered to the surfaces of said electrodes passing a direct-current electricity through the electrolyte-added waste water to effect its electrolysis and generate metallic cations from said solid metallic anode to thereby coagulate said water-soluble colloidally dispersed materials selected from at least one of water soluble protein, visceral matter or blood and thereafter separating the precipitated solid matter from the waste water.

2. The method according to claim 1 wherein said electrolyte is sodium chloride.

3. The method according to claim 1 wherein said

Table 3

| | Amount of NaCl added % | Electric power KW | Electrolysis time(min) | COD ppm | Removal rate % | Nitrogen content ppm | Removal rate % | Degree of transparency(cm) | Redness % |
|---|---|---|---|---|---|---|---|---|---|
| Original water | — | — | — | 1114 | — | 535 | — | 1.5 | 0.9 |
| Pressurized flotation method | — | — | — | 539 | 51.6 | 336 | 37.2 | 18 | 0 |
| Treated water | 0 | 200 | 10 | 292 | 73.6 | 213 | 60.2 | above 30 | 0 |
| " | 0 | 200 | 15 | 252 | 77.4 | 232 | 56.2 | above 30 | 0 |
| " | 0 | 200 | 20 | 122 | 89.0 | 200 | 62.6 | above 30 | 0 |
| " | 0.1 | 200 | 5 | 319 | 71.4 | 236 | 55.9 | above 30 | 0 |
| " | 0.1 | 200 | 10 | 164 | 85.3 | 166 | 69.0 | above 30 | 0 |
| " | 0.1 | 200 | 15 | 216 | 80.6 | 195 | 63.6 | above 30 | 0 |
| " | 0.1 | 200 | 20 | 120 | 89.2 | 161 | 70.0 | above 30 | 0 |
| " | 3.0 | 200 | 5 | 331 | 70.3 | 213 | 60.2 | above 30 | 0 |
| " | 3.0 | 200 | 10 | 318 | 71.5 | 209 | 60.9 | above 30 | 0 |
| " | 3.0 | 200 | 15 | 245 | 78.0 | 143 | 73.0 | above 30 | 0 |

What is claimed is:

1. A method of purifying the contaminated waste water that is produced in the slaughter and processing of livestock and aquatic animals and containing water-soluble colloidally dispersed materials selected from at least one of water soluble protein, visceral matter or blood, said method comprising passing said waste water through the compartments of at least one electrolytic tank containing a plurality of compartments, each compartment separated from the next adjacent compartment by an electrically insulated partitioning plate, each compartment containing at least one pair of electrode plates comprising a solid metallic anode selected from iron, stainless steel or aluminum and a cathode, adding to said waste water at least one electrolyte selected from the group consisting of the halides, halogen acid salts and nitrates of the alkali metals, alkaline earth metals and ammonium in an amount such that the concentration of said electrolyte in the waste water is 0.03 – 1.7 % by weight, agitating the waste water in each compartment and removing any waste matter adelectrolyte is added in an amount such that the concentration of the electrolyte is 0.3 – 0.5 % by weight. –

4. The method according to claim 1 wherein the waste water is passed through at least three of said electrolytic tanks comprising adding a prescribed amount of the waste water to a first tank, adding the electrolyte thereto and then commencing the electrolysis of waste water in said first tank; starting the addition of waste water to a second tank during the time the electrolysis is proceeding in said first tank; completing the electrolysis of waste waster in said first tank by the time said second tank becomes full; adding the electrolyte to the waste water-filled second tank and commencing electrolysis of the waste water therein; discharging the treated waste water from said first tank and filling a third tank with waste waster during the time the electrolysis of waste water in said second tank is proceeding, and thereafter repeating the foregoing operations in the sequence given to thereby effect the continuous purification of the waste water.

\* \* \* \* \*